G. S. FOSTER.
SHOCK ABSORBER FOR VEHICLES.
APPLICATION FILED OCT. 21, 1911.
1,043,820.
Patented Nov. 12, 1912.
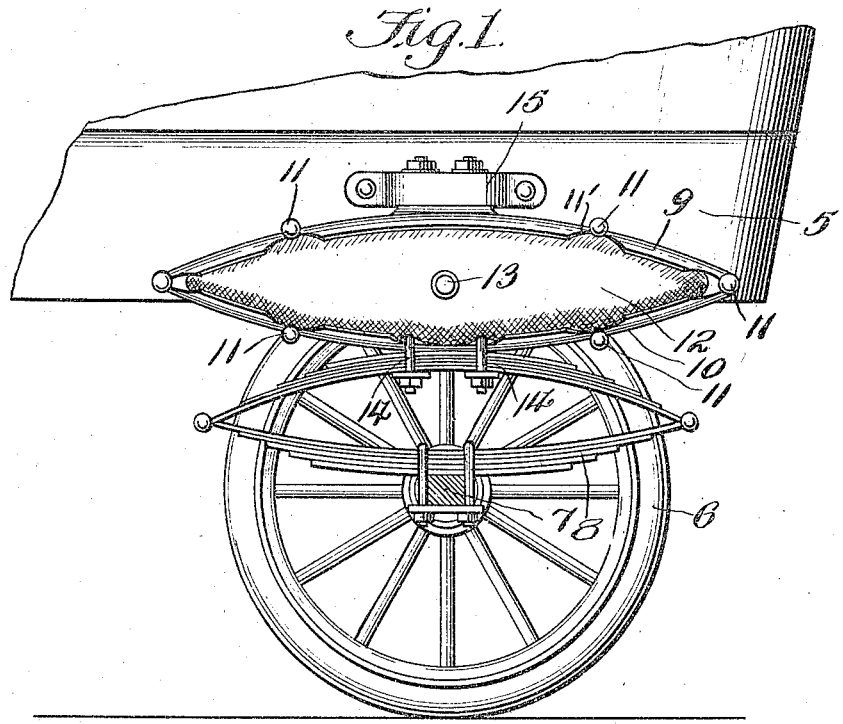
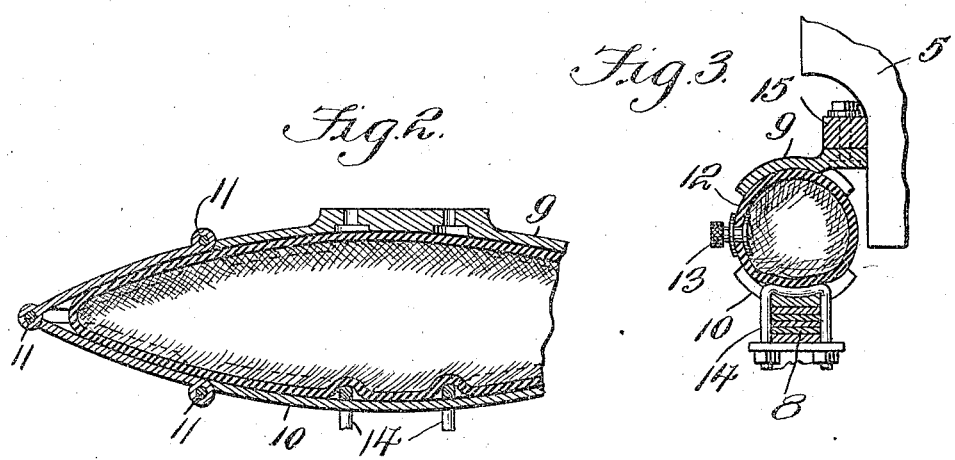
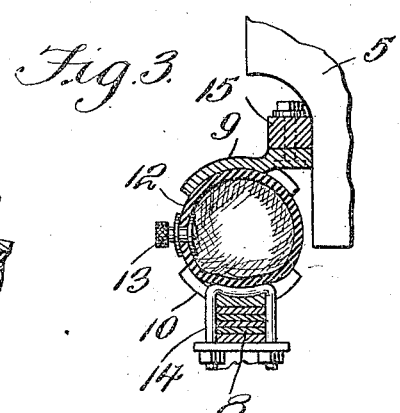
Witnesses
Inventor
George S. Foster,
By Victor J. Evans,
Attorney

UNITED STATES PATENT OFFICE.

GEORGE S. FOSTER, OF PUEBLO, COLORADO.

SHOCK-ABSORBER FOR VEHICLES.

1,043,820.  Specification of Letters Patent.  Patented Nov. 12, 1912.

Application filed October 21, 1911. Serial No. 655,960.

*To all whom it may concern:*

Be it known that I, GEORGE S. FOSTER, a citizen of the United States, residing at Pueblo, in the county of Pueblo and State of Colorado, have invented new and useful Improvements in Shock-Absorbers for Vehicles, of which the following is a specification.

The invention relates to pneumatic cushioning devices, and more particularly to the class of shock absorbers for vehicles, automobiles, or the like.

The primary object of the invention is the provision of a device of this character in which the body and the running gear of a vehicle will be elastically separated, so that on the travel of the vehicle, vibrations will be absorbed, thereby relieving the body of the vehicle from shocks and jars incident to the travel of the said vehicle.

Another object of the invention is the provision of a device of this character in which the body of a vehicle will be elastically supported upon the running gear, so that all shocks and jars will be relieved, without imparting the same to the vehicle body, the device being readily and easily applied to the vehicle, and when used will obviate the necessity of the employment of cushion or pneumatic tires ordinarily used.

A further object of the invention is the provision of a device of this character which is extremely simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a fragmentary side elevation of a vehicle, showing the device applied thereto constructed in accordance with the invention. Fig. 2 is an enlarged fragmentary vertical longitudinal sectional view through the device. Fig. 3 is a vertical transverse sectional view through the device.

Similar reference characters indicate corresponding parts throughout the several views of the drawings.

Referring to the drawings by numerals, 5 designates a portion of the body of a vehicle, in this instance, of the automobile type, 6 the ground wheels, 7 the axle supporting the ground wheels, and 8 the usual elliptical shaped spring which is clipped or otherwise mounted upon the axle 7 in the usual manner.

Carried by the upper half of the spring 8 is the shock absorber, comprising a substantially elliptical shaped frame, including a plurality of upper and lower sections 9 and 10, respectively, the adjacent ends 11' of the sections being reduced in width and connected by means of suitable hinged joints 11 for affording the necessary flexing of the frame, the upper and lower sections 9 and 10 being dished in cross section, so as to form proper seats for retaining a substantially cigar shaped air bag or casing 12 which may be made from any suitable material, and is formed with an inflating tube 13 which permits the attachment of a pump (not shown), whereby the bag 12 may be filled with air or inflated the required degree for absorbing shocks and jars incident to the travel of the vehicle over uneven surfaces in the ground.

The frame for supporting the air bag 12 is secured to the upper half of the spring 8 by means of the usual clips 14. Fixed to the frame 5 and projecting outwardly therefrom, at the side thereof, is a bracket 15, the latter being bolted or otherwise secured to the frame, as will be seen. It is, of course, understood that the frame with the air bag 12 mounted therein may be interposed between the axle 7 and the spring 8, without requiring any alteration in the spring or the said axle, should the occasion demand.

What is claimed is:

In a shock absorber, an elliptical shaped frame including a plurality of hinged sections, said sections having their adjacent ends reduced in width, the top and bottom stretches of said frame being longitudinally channeled at the inner sides and an inflated bag seated in said channels and substantially filling the frame.

In testimony whereof I affix my signature in presence of two witnesses.

GEORGE S. FOSTER.

Witnesses:
CHARLES H. SAMBRON,
LOGAN RAGLE.